US012560828B2

(12) United States Patent　　　　(10) Patent No.:　US 12,560,828 B2

Huang et al.　　　　　　　　　　　(45) Date of Patent:　　Feb. 24, 2026

(54) CONTACT LENS

(71) Applicant: PEGAVISION CORPORATION, Taoyuan (TW)

(72) Inventors: Yi-Fang Huang, Kinmen County (TW); Shih-Siang Lin, New Taipei (TW)

(73) Assignee: PEGAVISION CORPORATION, Taoyuan (TW)

( * ) Notice: Subject to any disclaimer, the term of this patent is extended or adjusted under 35 U.S.C. 154(b) by 415 days.

(21) Appl. No.: 18/318,733

(22) Filed: May 17, 2023

(65)　　　　　Prior Publication Data

US 2023/0400712 A1　　Dec. 14, 2023

Related U.S. Application Data

(60) Provisional application No. 63/351,432, filed on Jun. 12, 2022.

(51) Int. Cl.
　　　*G02C 11/00*　　　(2006.01)
　　　*G02B 1/04*　　　(2006.01)
　　　*G02C 7/04*　　　(2006.01)
(52) U.S. Cl.
　　　CPC ............. *G02C 11/10* (2013.01); *G02B 1/043* (2013.01); *G02C 7/04* (2013.01); *G02C 7/049* (2013.01)
(58) Field of Classification Search
　　　CPC ......... G02C 11/10; G02C 11/00; G02C 7/04; G02C 7/049; G02C 7/046; G02C 7/047; G02B 1/043; B29D 11/00038; B29D 11/00826
　　　USPC ....................................................... 351/158
　　　See application file for complete search history.

(56)　　　　　References Cited

U.S. PATENT DOCUMENTS

| | | | |
|---|---|---|---|
| 8,721,074 B2 * | 5/2014 | Pugh | H05K 1/0274 |
| | | | 359/254 |
| 9,696,564 B1 | 7/2017 | Etzkorn et al. | |
| 10,001,661 B1 | 6/2018 | Weibel et al. | |
| 2010/0109175 A1 * | 5/2010 | Pugh | G02C 7/04 |
| | | | 264/1.36 |
| 2012/0236254 A1 * | 9/2012 | Pugh | B29D 11/00826 |
| | | | 351/159.01 |

(Continued)

FOREIGN PATENT DOCUMENTS

| | | |
|---|---|---|
| CN | 103135252 A | 6/2013 |
| CN | 203941356 U | 11/2014 |

(Continued)

*Primary Examiner* — William R Alexander

(74) *Attorney, Agent, or Firm* — Li & Cai Intellectual Property Office

(57)　　　　　ABSTRACT

A contact lens includes a lens body, an electronic component, and a circuit structure. The lens body includes an optical portion and an annular wearing portion that surrounds the optical portion. The annular wearing portion has a layout region having a C-shape and a lower eyelid region that is arranged between two ends of the layout region. The electronic component is embedded in the lower eyelid region. The circuit structure is embedded in the annular wearing portion. The circuit structure includes a carrier and a circuit that is formed on the carrier and that is connected to the electronic component. The carrier has a C-shaped segment embedded in the layout region. The C-shaped segment has at least one thru-hole having an area that is within a range from 1% to 85% of an area surrounded by an outer contour of the C-shaped segment.

22 Claims, 16 Drawing Sheets

(56) References Cited

U.S. PATENT DOCUMENTS

| | | | | |
|---|---|---|---|---|
| 2013/0135578 A1* | 5/2013 | Pugh | ...................... | G02C 7/04 |
| | | | | 351/159.39 |
| 2014/0240655 A1 | 8/2014 | Pugh et al. | | |
| 2014/0268027 A1* | 9/2014 | Pugh | ............... | B29D 11/00038 |
| | | | | 351/159.73 |
| 2014/0296673 A1 | 10/2014 | Etzkorn | | |
| 2014/0333892 A1* | 11/2014 | Pugh | ...................... | G02C 7/04 |
| | | | | 351/159.03 |
| 2014/0371560 A1 | 12/2014 | Etzkorn et al. | | |
| 2015/0004058 A1 | 1/2015 | Yao et al. | | |
| 2015/0188197 A1 | 7/2015 | Liu et al. | | |
| 2015/0362754 A1 | 12/2015 | Etzkorn et al. | | |
| 2015/0378176 A1* | 12/2015 | Flitsch | ................... | H01L 23/58 |
| | | | | 623/6.56 |
| 2016/0056417 A1* | 2/2016 | Flitsch | .................. | G02C 7/083 |
| | | | | 429/185 |
| 2017/0042480 A1 | 2/2017 | Gandhi et al. | | |
| 2017/0229730 A1 | 8/2017 | Flitsch et al. | | |
| 2017/0293164 A1* | 10/2017 | Flitsch | ............. | H01M 10/0436 |
| 2017/0299892 A1 | 10/2017 | Pugh et al. | | |
| 2017/0352865 A1* | 12/2017 | Flitsch | ............... | H01M 4/0473 |
| 2018/0039097 A1* | 2/2018 | Gutierrez | ............. | A61B 5/6843 |
| 2018/0101027 A1* | 4/2018 | Otts | .................... | H01M 50/489 |
| 2018/0104921 A1* | 4/2018 | Beyad | ................. | H01M 10/049 |
| 2018/0136492 A1 | 5/2018 | An et al. | | |
| 2019/0387619 A1 | 12/2019 | Vasquez Quintero | | |
| 2021/0055573 A1 | 2/2021 | Back et al. | | |
| 2021/0063773 A1 | 3/2021 | Ice et al. | | |
| 2022/0171218 A1 | 6/2022 | Sakuma et al. | | |

FOREIGN PATENT DOCUMENTS

| | | | |
|---|---|---|---|
| CN | 105143965 A | 12/2015 |
| CN | 105278119 A | 1/2016 |
| CN | 108231181 A | 6/2018 |
| CN | 108807838 A | 11/2018 |
| CN | 210019704 U | 2/2020 |
| EP | 4290295 A1 | 12/2023 |
| IN | 107710056 A | 2/2018 |
| JP | 2017520783 A | 7/2017 |
| TW | I581033 B | 5/2017 |
| TW | I745092 B | 11/2021 |
| WO | WO2015157855 A1 | 10/2015 |
| WO | WO2018115819 A1 | 6/2018 |
| WO | WO2022050451 A1 | 3/2022 |
| WO | WO2023241079 A1 | 12/2023 |

* cited by examiner

CONTACT LENS

CROSS-REFERENCE TO RELATED PATENT APPLICATION

This application claims the benefit of priority to the U.S. Provisional Patent Application Ser. No. 63/351,432 filed on Jun. 12, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a contact lens, and more particularly to a smart contact lens.

BACKGROUND OF THE DISCLOSURE

A conventional smart contact lens has a carrier for forming a circuit or carrying an electronic component. However, in a manufacturing process of the conventional smart contact lens, wrinkles or stress concentration may be formed as a result of the carrier being bent, thereby affecting the electrical performance of the conventional smart contact lens.

SUMMARY OF THE DISCLOSURE

In response to the above-referenced technical inadequacies, the present disclosure provides a contact lens to effectively improve on the issues associated with conventional smart contact lenses.

In order to solve the above-mentioned problems, one of the technical aspects adopted by the present disclosure is to provide a contact lens, which includes a lens body and a circuit structure. The lens body includes an optical portion and an annular wearing portion that surrounds the optical portion. The annular wearing portion has a layout region being C-shaped and a lower eyelid region that is arranged between two ends of the layout region. The circuit structure is embedded in the annular wearing portion, and includes a carrier and a circuit. The carrier has a C-shaped segment embedded in the layout region and a connection segment that is embedded in the lower eyelid region. The connection segment is connected in-between two distal ends of the C-shaped segment. The circuit is formed on the carrier. The C-shaped segment has at least one thru-hole that is fully filled with the lens body. In a top view of the contact lens, an area of the at least one thru-hole is 1% to 85% of an area surrounded by an outer contour of the C-shaped segment.

Therefore, the contact lens of the present disclosure is provided with the at least one thru-hole being formed on the C-shaped segment and having a specific area, thereby effectively reducing the generation of wrinkles or the stress concentration on the carrier, and further increasing the oxygen permeability of the contact lens.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
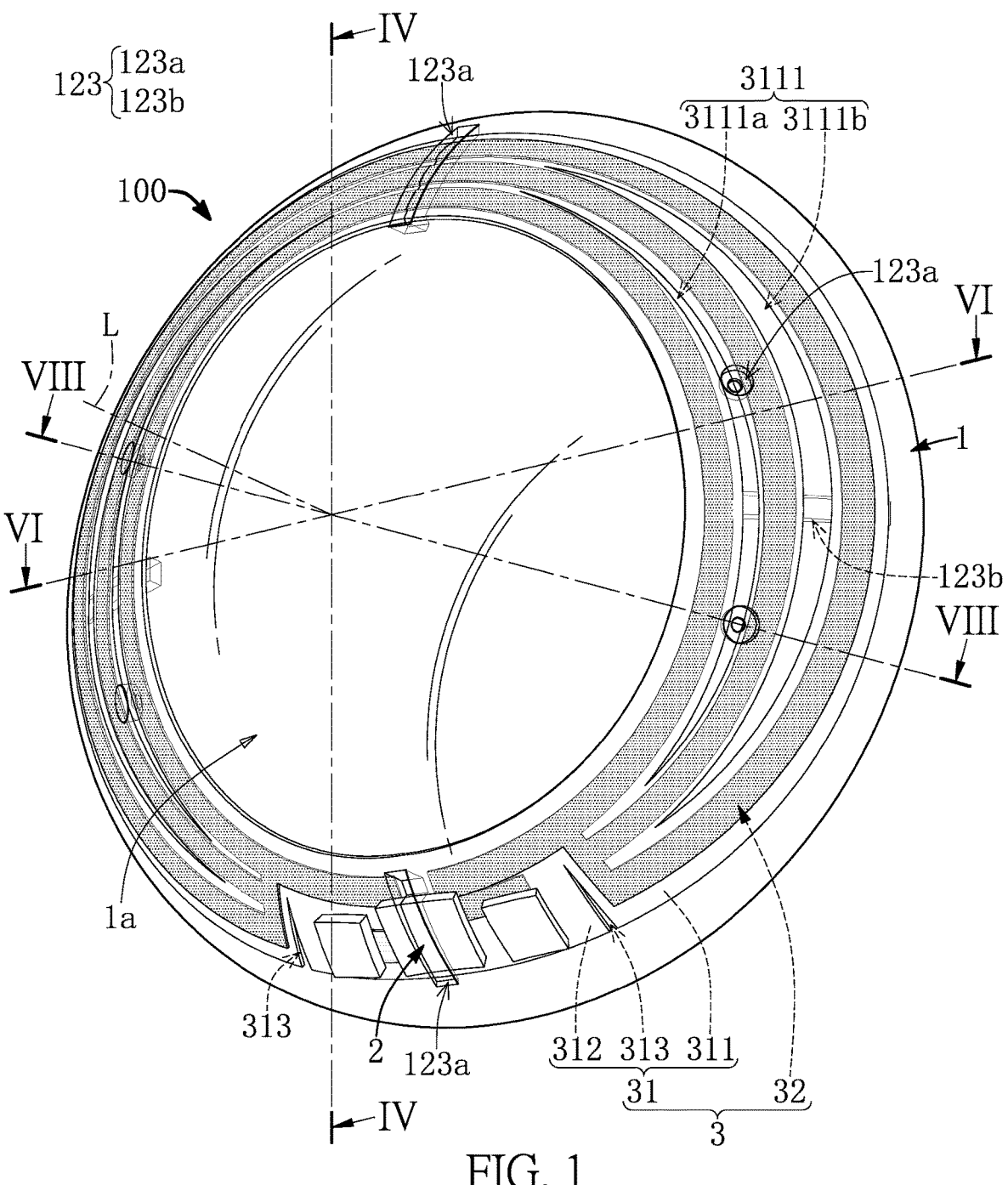
FIG. 1 is a schematic perspective view of a contact lens according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
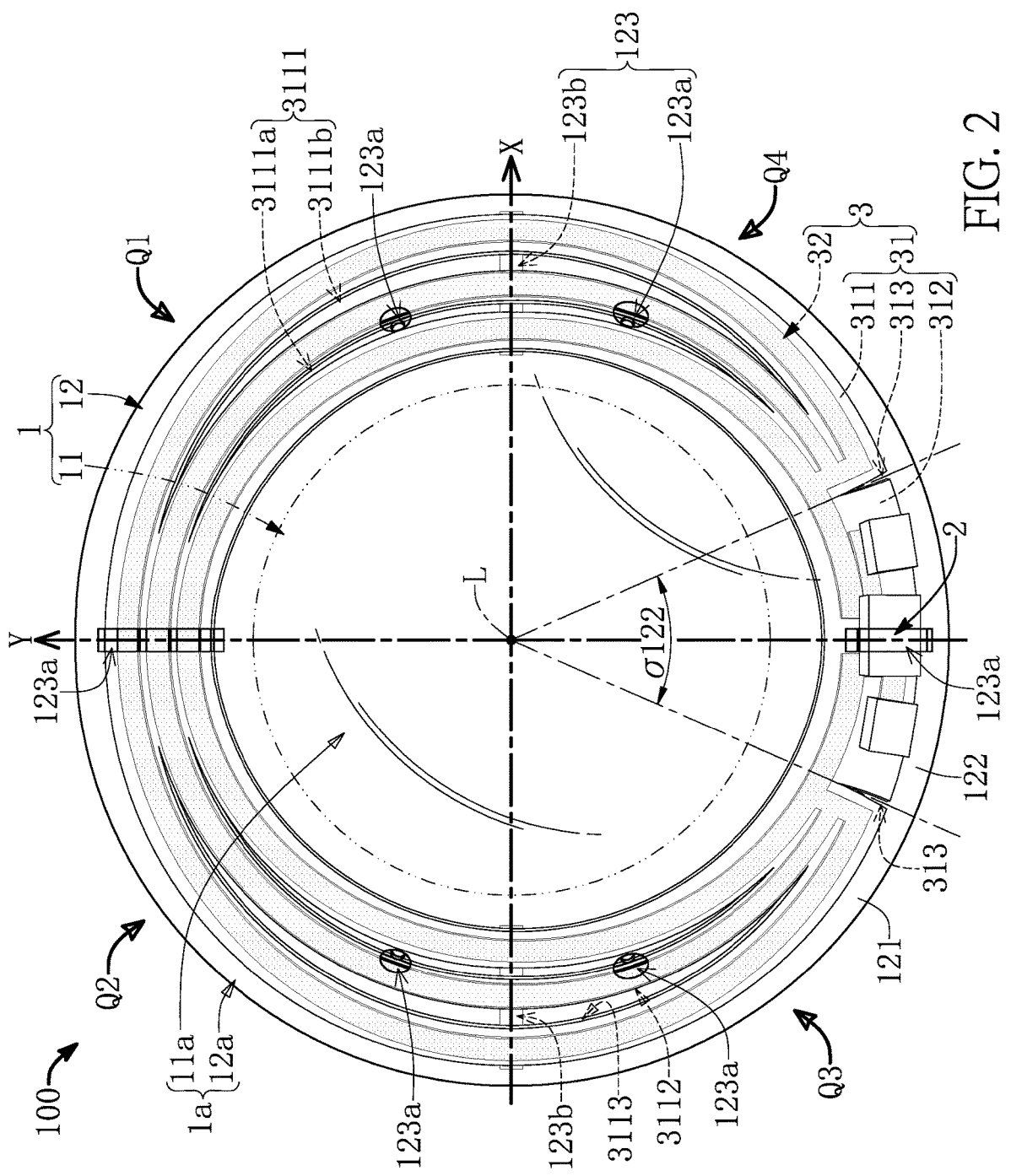
FIG. 2 is a schematic top view of FIG. 1.
Figure 3:
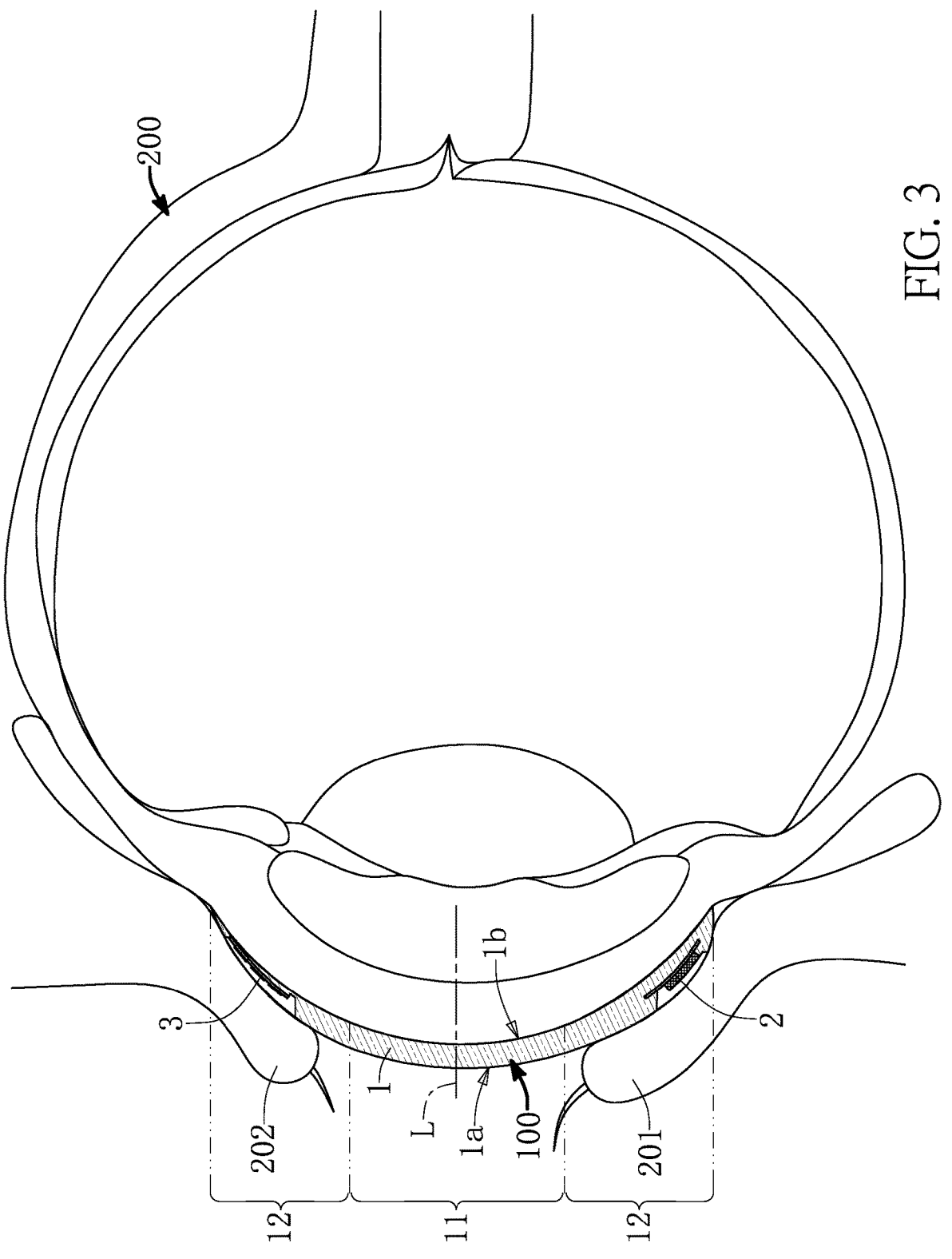
FIG. 3 is a schematic planar view showing the contact lens worn on a user's eye according to a first embodiment of the present disclosure.

Referring to FIG. 1 to FIG. 9, a first embodiment of the present disclosure is provided. As shown in FIG. 1 to FIG. 4, the present embodiment provides a contact lens 100 that can be referred to as a smart contact lens. The contact lens 100 can be worn on an eye 200 of a user (as shown in FIG. 3) or can be embedded in the eye 300 (not shown in the drawings) according to design requirements.

Moreover, the contact lens 100 in the present embodiment can have a correcting function for a refractive error that includes hyperopia, myopia, astigmatism, presbyopia, or astigmatism-presbyopia; or, the contact lens 100 can be a makeup lens without the correcting function.

The contact lens 100 in the present embodiment includes a lens body 1, an electronic component 2 embedded in the lens body 1, and a circuit structure 3 that is embedded in the lens body 1 and that is electrically coupled to the electronic component 2, but the present disclosure is not limited thereto. For example, in other embodiments of the present disclosure not shown in the drawings, according to design requirements, the contact lens 100 can include only the lens body 1 and the circuit structure 3, and be provided without the electronic component 2. The following description describes the structural and connection relationship of each component of the contact lens 100.

The lens body 100 in the present embodiment is formed by solidifying a hydrogel (e.g., p-HEMA) or a silicone hydrogel, but the present disclosure is not limited thereto. The lens body 1 includes an optical portion 11 and an annular wearing portion 12 that surrounds the optical portion 11. The optical portion 11 can be formed with or without the correcting function for the refractive error according to design requirements. It should be noted that the optical portion 11 of the present embodiment is provided without any component embedded therein, but the optical portion 11 can also be formed to have at least one component embedded therein according to design requirements (e.g., when the contact lens 100 is applied to a digital zoom device) and is not limited by the description of the present embodiment.

Moreover, the optical portion 11 defines a central axis L, and a center of the optical portion 11 and a center of the annular wearing portion 12 are located on the central axis L. The annular wearing portion 12 is connected to an outer edge of the optical portion 11 and is substantially in a circular ring shape, and the electronic component 2 and the circuit structure 3 are embedded in the annular wearing portion 12. In addition, a production manner relevant to the electronic component 2 and the circuit structure 3 embedded in the annular wearing portion 12 (or a manufacturing method of the contact lens 100) can be adjusted or changed according to design requirements, but the present disclosure is not limited thereto.

Specifically, the annular wearing portion 12 has a layout region 121 being C-shaped and a lower eyelid region 122 that is arranged between two ends of the layout region 121. The electronic component 2 is embedded in the lower eyelid region 122 of the annular wearing portion 12. When the contact lens 100 is worn on the eye 200, the lower eyelid region 122 and the electronic component 2 are arranged inside of a lower eyelid 201 of the eye 200 that is less sensitive, thereby effectively reducing a foreign body sensation (FBS) of the user.

In other words, as shown in FIG. 2 to FIG. 5, (surfaces of) the lens body 1 includes a rear surface 1b and a front surface 1a that is arranged opposite to the rear surface 1b. The rear surface 1b has a predetermined curvature only relevant to the eye 200 for being worn on (or smoothly attached to) the eye 200.

Moreover, the front surface 1a has a viewable surface 11a corresponding in position to the optical portion 11 and a free curved surface 12a that corresponds in position to the annular wearing portion 12. The viewable surface 11a has a first curvature relevant to an optical design for correcting the refractive error; or, the first curvature of the viewable surface 11a and the rear surface 1b can jointly form a structure with no diopter.

Specifically, the first curvature of the viewable surface 11a is different from a second curvature of the free curved surface 12a, and a thickness of the annular wearing portion 12 gradually increases in a direction toward the electronic component 2 (or the lower eyelid region 122), but the present disclosure is not limited thereto. For example, in other embodiments of the present disclosure not shown in the drawings, the first curvature can be substantially equal to the second curvature, and the thickness of the annular wearing portion 12 is substantially uniform.

In other words, any position of the annular wearing portion 12 of the contact lens 100 can be provided to have at least one the electronic component 2 embedded therein according to design requirements. For example, in other embodiments of the present disclosure not shown in the drawings, two opposite sides of the annular wearing portion 12 in a horizontal direction of the eye 200 can each be provided to have at least one the electronic component 2 embedded therein, so that the annular wearing portion 12 has a largest thickness in the horizontal direction and becomes gradually thinner in a vertical direction of the eye 200. Accordingly, the above arrangement of the contact lens 100 can enable the contact lens 100 to receive at least two of the electronic components 2 and to reduce the FBS of the user.

In summary, the contact lens 100 of the present embodiment is provided with the free curved surface 12a arranged on the front surface 1a of the lens body 1, so that a thickness of the layout region 121 does not need to be based completely on (or be equal to) a thickness of the lower eyelid region 122 for thinning the layout region 121. Accordingly, an oxygen permeability of the layout region 121 can be effectively increased, and the FBS of the contact lens 100 can be reduced (or improved).

In order to further increase the oxygen permeability of the layout region 121 and further reduce the FBS of the contact lens 100, the contact lens 100 preferably has at least one of the technical features disclosed in the following paragraphs by adjusting the second curvature of the free curved surface 12a, but the present disclosure is not limited thereto.

The annular wearing portion 12 (e.g., a part of the annular wearing portion 12 corresponding to the electronic component 2 and the circuit structure 3) has a largest thickness Tmax located at a part of the annular wearing portion 12 (e.g., the lower eyelid region 122) corresponding in position to the electronic component 2, and also has a smallest thickness Tmin located at a part of the layout region 121 (e.g., a top part of the layout region 121 shown in FIG. 4) away from the lower eyelid region 122. In other words, when the contact lens 100 is worn on the eye 200, the part of the annular wearing portion 12 of the contact lens 100 having the largest thickness Tmax is located inside of the lower eyelid 201 of the eye 200, and the part of the annular wearing portion 12 of the contact lens 100 having the smallest thickness Tmin is located inside of the upper eyelid 202 of the eye 200. The largest thickness Tmax and the smallest thickness Tmin in the present embodiment respectively correspond in position to the lower eyelid 201 and the upper eyelid 202 of the user, but the relationship between the thickness of the contact lens 100 and the eyelids 201, 202 of the user in the present disclosure is not limited thereto.

Moreover, the circuit structure 3 in the lower eyelid region 122 is spaced apart from the rear surface 1*b* by a first distance D122, and the circuit structure 3 in the layout region 121 is spaced apart from the rear surface 1*b* by a second distance D121 that is less than the first distance D122.

The circuit structure 3 arranged in the lens body 1 can be independently used (not shown in the drawings) or can be cooperated with the electronic component 2, so that the circuit structure 3 (and the electronic component) can be electrically or physically driven to implement at least one of functions, which include energy reception, wireless signal transmission, digital calculation, sensing and monitoring, pressure application, current release, image projection, optical zoom, and power storage, but the present disclosure is not limited thereto.

The circuit structure 3 in the present embodiment includes a carrier 31 and a circuit 32 (e.g., a metallic circuit) formed on the carrier 31. The circuit 32 is connected to the electronic component 2 to be electrically coupled to each other. In the present embodiment, the carrier 31 can be shaped to form a predetermined curved structure by being pressed from a mold at a normal temperature or a high temperature, so that the carrier 31 has a fixed curvature that is different from the second curvature, and the fixed curvature is preferably close to the predetermined curvature of the rear surface 1*b* (e.g., the fixed curvature is 100% to 110% of the predetermined curvature), but the present disclosure is not limited thereto.

The carrier 31 in the present embodiment is a flexible printed circuit board (FPCB) having a thickness within a range from 10 μm to 300 μm. Moreover, the thickness of the carrier 31 is preferably within a range from 40 μm to 80 μm, and polymer materials of the carrier 31 can include polyimide (PI), liquid-crystal polymer (LCP), polyethylene terephthalate (PET), or poly(ethylene 2,6-naphthalene dicarboxylate) (PEN), but the present disclosure is not limited thereto.

Specifically, the carrier 31 has a C-shaped segment 311 embedded in the layout region 121 and a connection segment 312 that is embedded in the lower eyelid region 122. The connection segment 312 is connected in-between two distal ends of the C-shaped segment 311. The electronic component 2 can be assembled to the connection segment 312, and the circuit 32 is formed on the C-shaped segment 311 and extends to the connection segment 312 for being electrically coupled to the electronic component 2.

Moreover, since the carrier 31 easily wrinkles or has stress concentration in a pressing and forming process, the C-shaped segment 311 has at least one thru-hole 3111 that is fully filled with the lens body 1. It should be noted that, in a top view of the contact lens 100 along (or perpendicular to) the central axis L, an area of the at least one thru-hole 3111 is 1% to 85% (e.g., preferably 10% to 40%) of an area surrounded by an outer contour of the C-shaped segment 311, thereby effectively reducing generation of the wrinkles or the stress concentration on the carrier 31, and further increasing the oxygen permeability of the contact lens 100 by being cooperated with the free curved surface 12*a*.

In addition, the carrier 31 can have a plurality of radial notches 313 recessed from an outer edge thereof toward the central axis L, thereby further reducing the generation of wrinkles or the stress concentration on the carrier 31. The radial notches 313 in the present embodiment are respectively formed on boundaries between the C-shaped segment 311 and the connection segment 312, but the present disclosure is not limited thereto.

Moreover, in the top view of the contact lens 100, the area of the at least one thru-hole 3111 is 1% to 75% of an area of the annular wearing portion 12. Moreover, a quantity of the at least one thru-hole 3111 formed on the C-shaped segment 311 in the present embodiment is more than one. In other words, any board not having a thru-hole is different from the carrier 31 of the present embodiment.

In the present embodiment, the circuit 32 has at least one enclosed loop, and the thru-holes 3111 of the C-shaped segment 311 are arranged in the at least one enclosed loop of the circuit 32. It should be noted that a quantity of the at least one enclosed loop in the present embodiment is more than one, and the thru-holes 3111 are respectively arranged in the enclosed loops of the circuit 32, but the present disclosure is not limited thereto.

Each of the thru-holes 3111 is curved and has a width that gradually increases from two ends thereof toward a center thereof (e.g., the thru-hole 3111 in the present embodiment is substantially in a crescent shape). Specifically, any one of the thru-holes 3111 has an inner edge 3112 and an outer edge 3113, and two ends of the inner edge 3112 are respectively connected to two ends of the outer edge 3113 so as to form the two ends of the thru-hole 3111.

Any one of the inner edge 3112 and the outer edge 3113 is in an arced shape, a radius of the inner edge 3112 is less than a radius of the outer edge 3113, and a center of the inner edge 3112 and a center of the outer edge 3113 are respectively located on two different planes perpendicular to the central axis L. In other words, each of the thru-holes 3111 in the present embodiment is arranged along the fixed curvature of the carrier 31 and is not located on a flat plane.

In order to clearly describe the arrangement of the thru-holes 3111, the following relationships are described according to the top view of the contact lens 100. The central axis L defines an origin point, an X axis, and a Y axis that is perpendicular to the X axis, and the X axis and the Y axis are intersected at the origin point. The contact lens 100 is sequentially divided into a first quadrant Q1, a second quadrant Q2, a third quadrant Q3, and a fourth quadrant Q4 along a counterclockwise direction with respect to the origin point.

In the top view of the contact lens 100, the lower eyelid region 122 is arranged in the third quadrant Q3 and the fourth quadrant Q4, the Y axis is substantially a center line of the lower eyelid region 122, and a central angle 6122 of the lower eyelid region 122 with respect to the origin point is preferably within a range from 30 degrees to 180 degrees. The central angle 6122 can be changed according to design requirements and is not limited by the present embodiment.

Moreover, in the top view of the contact lens 100, the thru-holes 3111 are arranged in the first quadrant Q1, the second quadrant Q2, the third quadrant Q3, and the fourth quadrant Q4 (e.g., four parts of the thru-holes 3111 are respectively arranged in the first quadrant Q1, the second quadrant Q2, the third quadrant Q3, and the fourth quadrant Q4), and an area of any one of the four parts of the thru-holes 3111 is 50% to 150% of an area of another one of the four parts of the thru-holes 3111.

Specifically, in the top view of the contact lens 100, any one of the thru-holes 3111 is arranged across at least two quadrants (e.g., any one of the thru-holes 3111 is arranged in the first quadrant Q1 and the fourth quadrant Q4, or is arranged in the second quadrant Q2 and the third quadrant Q3), and any one of the thru-holes 3111 can be mirror symmetrical to the X axis, but the present disclosure is not limited thereto.

The thru-holes 3111 include at least one first thru-hole 3111*a* and at least one second thru-hole 3111*b*. Moreover, a quantity of the at least one first thru-hole 3111*a* and a quantity of the at least one second thru-hole 3111*b* in the present embodiment can each be more than one, but the present disclosure is not limited thereto. The first thru-holes 3111*a* are located at an inner side of the second thru-holes 3111*b*. In other words, a radius of each of the second thru-holes 3111*b* is different from (e.g., greater than) a radius of each of the first thru-holes 3111*a*.

In the present embodiment, each of the first thru-holes 3111*a* is in an arced shape having a center of circle located on the central axis L, and the first thru-holes 3111*a* are spaced apart from each other. Each of the second thru-holes 3111*b* is in an arced shape having a center of circle located on the central axis L, and the second thru-holes 3111*b* are spaced apart from each other.

Moreover, any one of the first thru-holes 3111*a* is located in a region defined by a central angle of the corresponding second thru-hole 3111*b*, and a partition between any two of the first thru-holes 3111*a* adjacent to each other and a partition between any two of the second thru-holes 3111*b* adjacent to each other are not arranged in a same radial direction of the contact lens 100.

Figure 4:
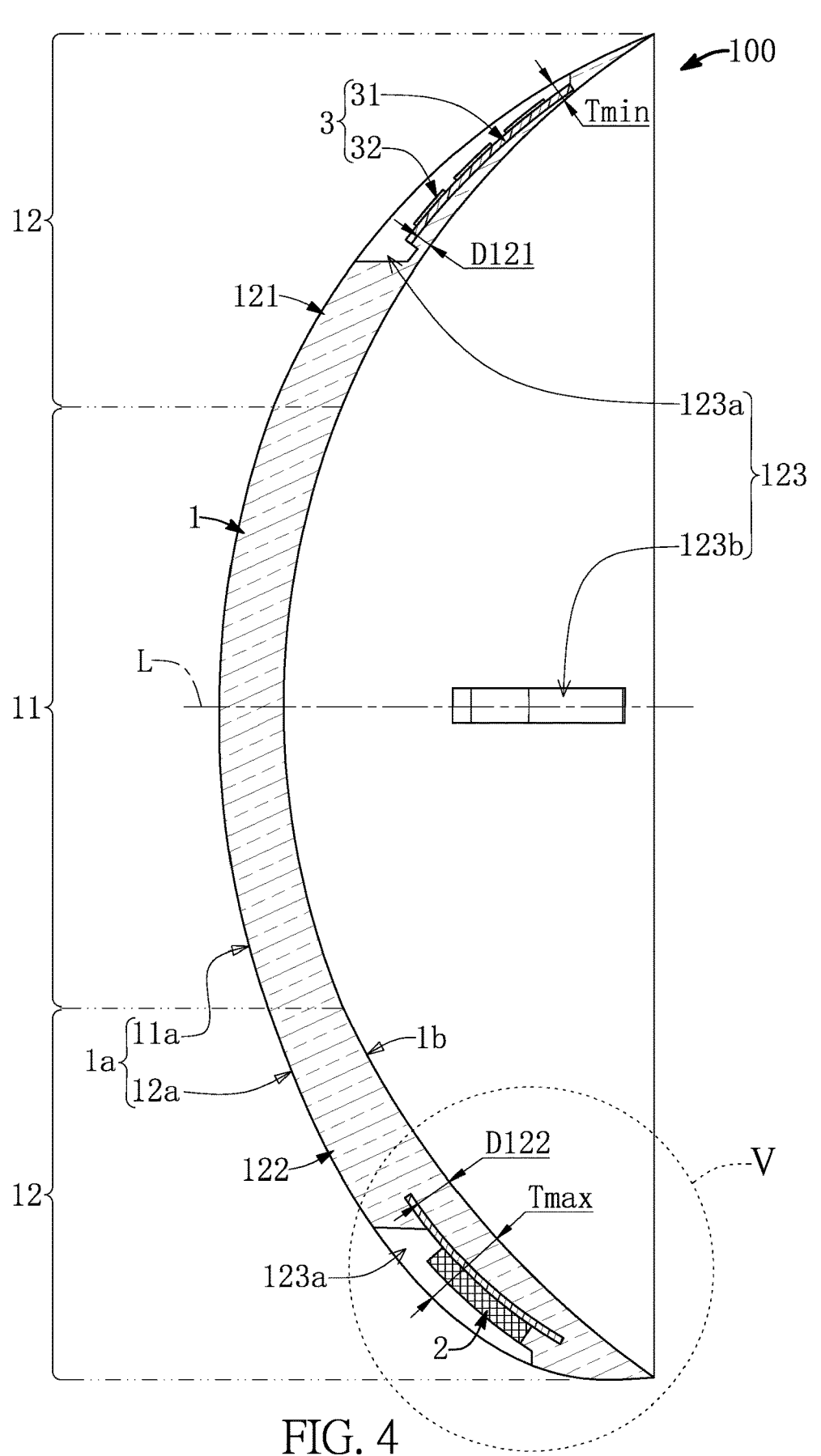
FIG. 4 is a schematic cross-sectional view taken along line IV-IV of FIG. 1.
Figure 5:
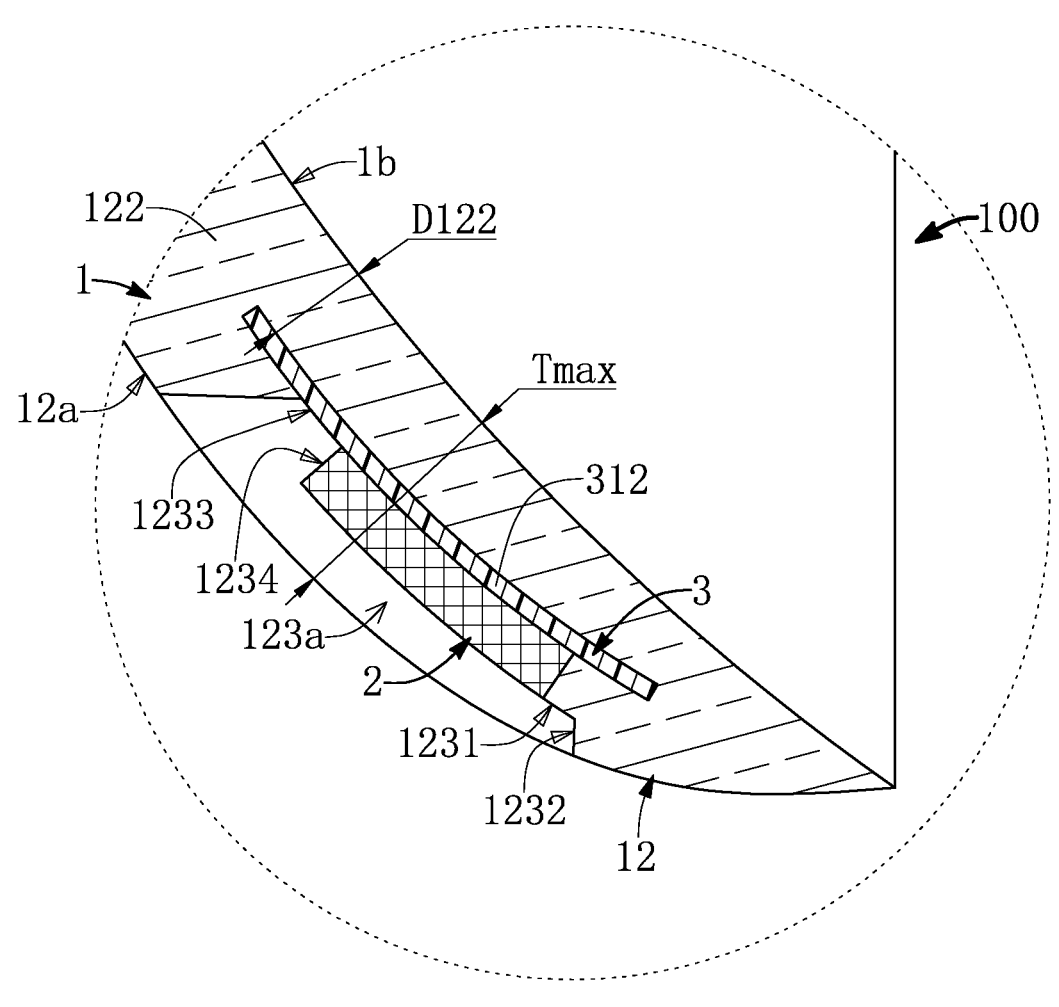
FIG. 5 is a schematic enlarged view of part V of FIG. 4.
Figure 6:
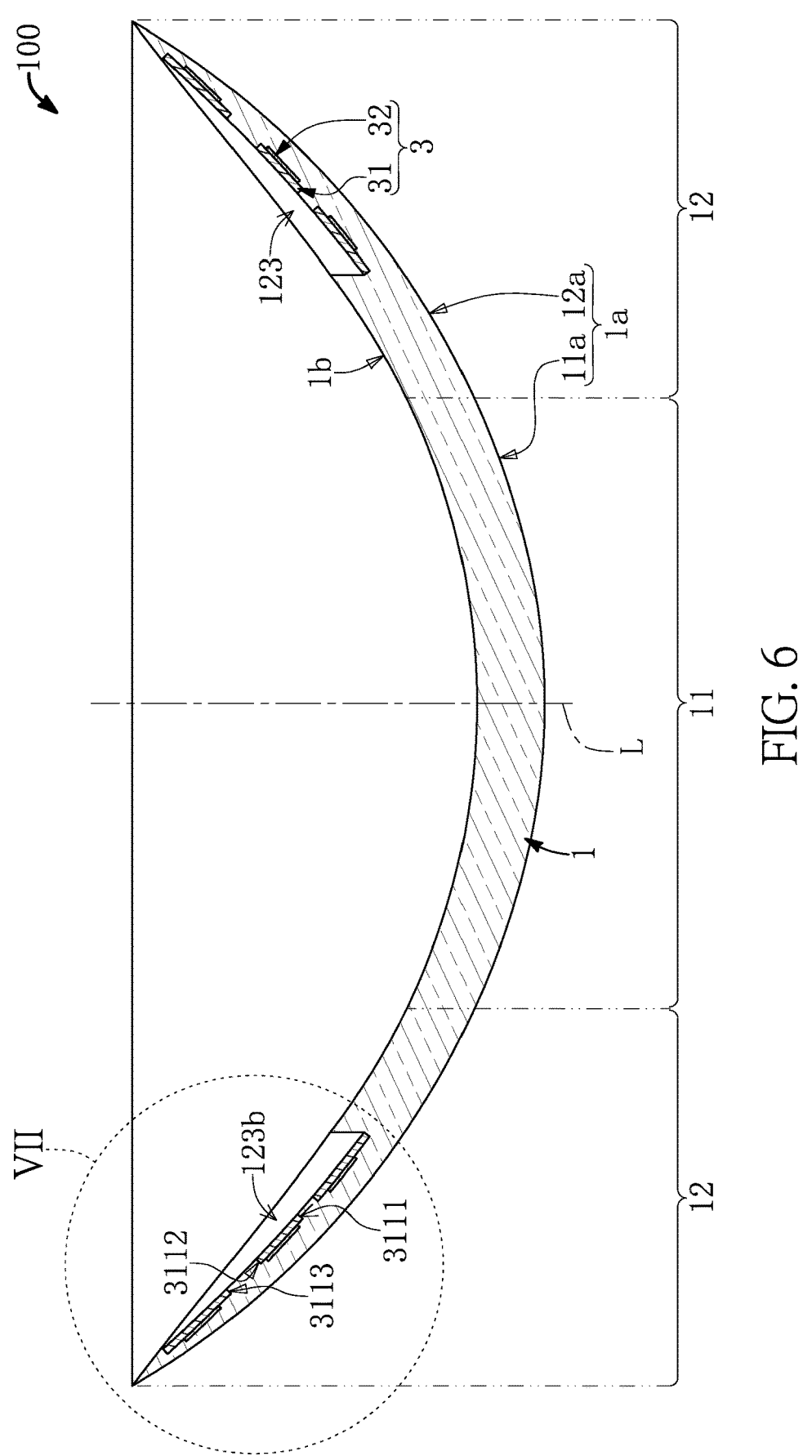
FIG. 6 is a schematic cross-sectional view taken along line VI-VI of FIG. 1.
Figure 7:
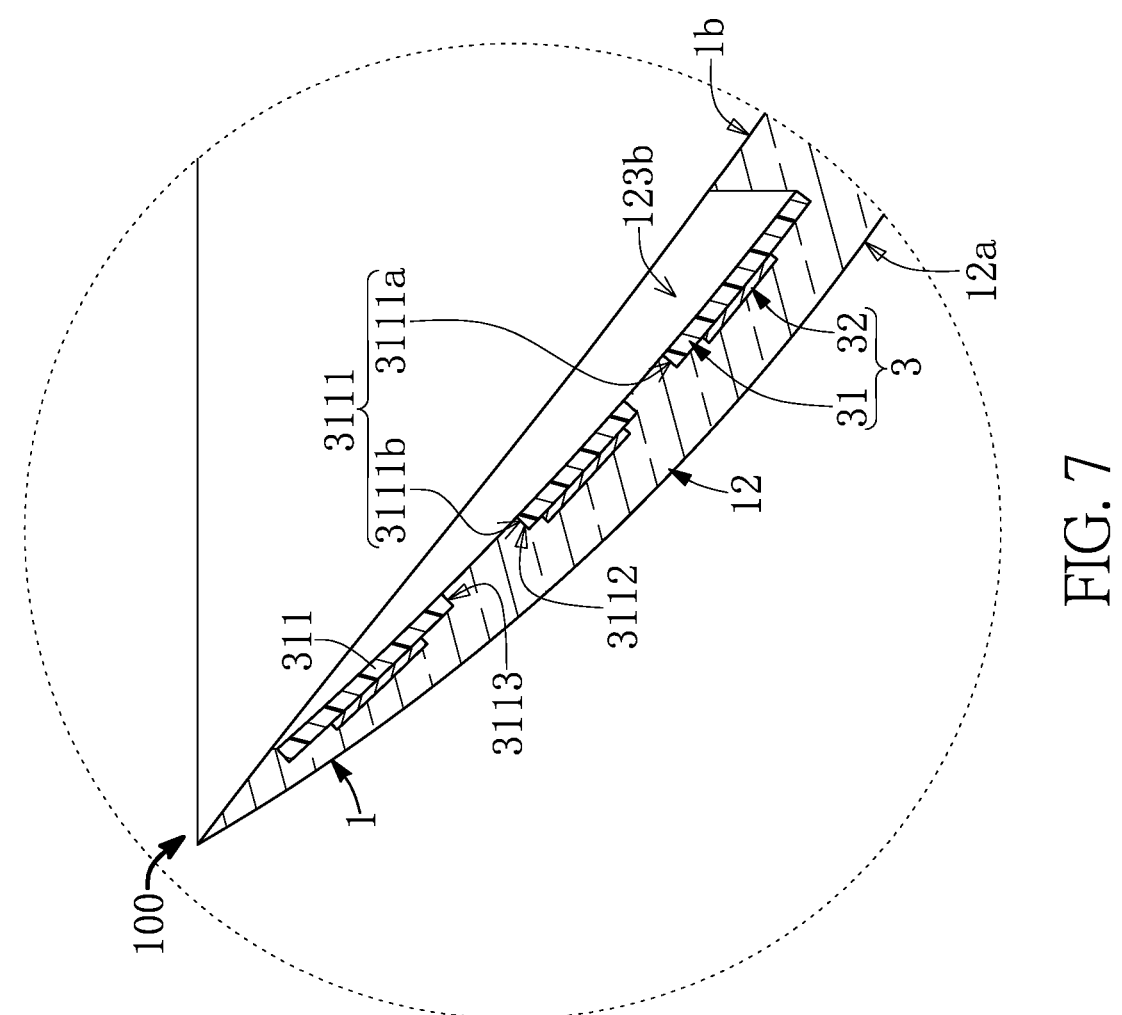
FIG. 7 is a schematic enlarged view of part VII of FIG. 6.

As shown in FIG. 2, FIG. 4, and FIG. 6, the annular wearing portion 12 has a plurality of positioning slots 123 recessed from at least one of the front surface 1*a* and the rear surface 1*b* toward the circuit structure 3, and a bottom side of each of the positioning slots 123 includes a part of the circuit structure 3 so as to enable the part of the circuit structure 3 to be exposed in an external environment, but the present disclosure is not limited thereto. For example, in other embodiments of the present disclosure not shown in the drawings, the annular wearing portion 12 can have only one positioning slot 123 or can be provided without any positioning slot 123.

Specifically, when the circuit structure 3 and the electronic component 2 are disposed in a forming mold (not shown in the drawings), positioning structures of the forming mold abut against the part of the circuit structure 3 to precisely position the circuit structure 3 and the electronic component 2 to a predetermined position, such that a hydrogel or a silicone hydrogel is injected into the forming mold to encapsulate the circuit structure 3 and the electronic component 2 and is solidified to form the lens body 1. After the contact lens 100 is taken out from the forming mold, parts of the lens body 1 covering the positioning structures of the forming mold respectively define the positioning slots 123.

In summary, in the contact lens 100 provided in the present embodiment, the annular wearing portion 12 is designed to have the positioning slots 123 for facilitating the high precision positioning of the circuit structure 3 and the electronic component 2 in the manufacturing process of the contact lens 100, so that the contact lens 100 can have a high conformity in mass production.

Moreover, the positioning slots 123 can be controlled in a specific scope (e.g., a sum of areas of openings of the positioning slots 123 is less than or equal to 1% of a sum of area of the front surface 1*a* and area of the rear surface 1*b*), thereby preventing the strength of the contact lens 100 from being affected. Part of the circuit structure 3 is exposed from the corresponding positioning slot 123 for increasing the heat-dissipation efficiency of the circuit structure 3.

Specifically, as shown in FIG. 4 to FIG. 9, the positioning slots 123 in the present embodiment include a plurality of front positioning slots 123*a* and a plurality of rear positioning slots 123*b*. The front positioning slots 123*a* are recessed from the front surface 1*a* (e.g., the free curved surface 12*a*) toward the circuit structure 3, and the rear positioning slots 123*b* are recessed from the rear surface 1*b* toward the circuit structure 3, but the present disclosure is not limited thereto.

Furthermore, a bottom side of each of the rear positioning slots 123*b* and/or a bottom side of each of the front positioning slots 123*a* can have a part of the circuit structure 3 so as to enable the part of the circuit structure 3 to be exposed in the outer environment. In the present embodiment, a depth of each of the front positioning slots 123*a* is within a range from 50 μm to 100 μm, and a depth of each of the rear positioning slots 123*b* is within a range from 50 μm to 100 μm. In other words, the contact lens 100 of the present embodiment is provided by designing the depths of the front positioning slots 123*a* and the rear positioning slots 123*b*, such that the circuit structure 3 can be precisely embedded in the lens body 1 at a predetermined depth. In addition, the predetermined depth can be changed according to design requirements, and is not limited by the present embodiment.

The rear positioning slots 123*b* and any one of the front positioning slots 123*a* in the present embodiment do not correspond to a same part of the circuit structure 3 for forming a multi-point positioning effect by the above staggered arrangement, thereby facilitating the high precision positioning of the circuit structure 3 and effectively preventing a specific point of the contact lens 100 from having a weak structural strength. In the top view of the contact lens 100 of the present embodiment, the front positioning slot 123*a* and the rear positioning slot 123*b* can each extend along a radial direction of the lens body 1 and across the circuit structure 3, but the present disclosure is not limited thereto.

Specifically, the front positioning slot 124*a* in the present embodiment is substantially a stepped structure. The front positioning slot 123*a* has a first tread surface 1231, a first riser surface 1232 connected in-between the front surface 1*a* (e.g., the free curved surface 12*a*) and the first tread surface 1231, a second tread surface 1233 spaced apart from the first tread surface 1231, and a second riser surface 1234 that is connected in-between the first tread surface 1231 and the second tread surface 1233.

The first tread surface 1231 is arranged on the bottom side of the first positioning slot 123*a*, and the first tread surface 1231 includes the part of the circuit structure 3 exposed in the external environment. The second tread surface 1233 is spaced apart from the front surface 1*a* (e.g., the free curved surface 12*a*) by a distance that is greater than a distance between the first tread surface 1231 and the front surface 1*a* (e.g., the free curved surface 12*a*). Moreover, the second riser surface 1234 is arranged at one side of the circuit structure 3 or one side of the electronic component 2, and the circuit 32 is entirely embedded in the lens body 1. In other words, the circuit structure 3 can be exposed from the positioning slots 123 only through a part of the carrier 31.

Figure 8:
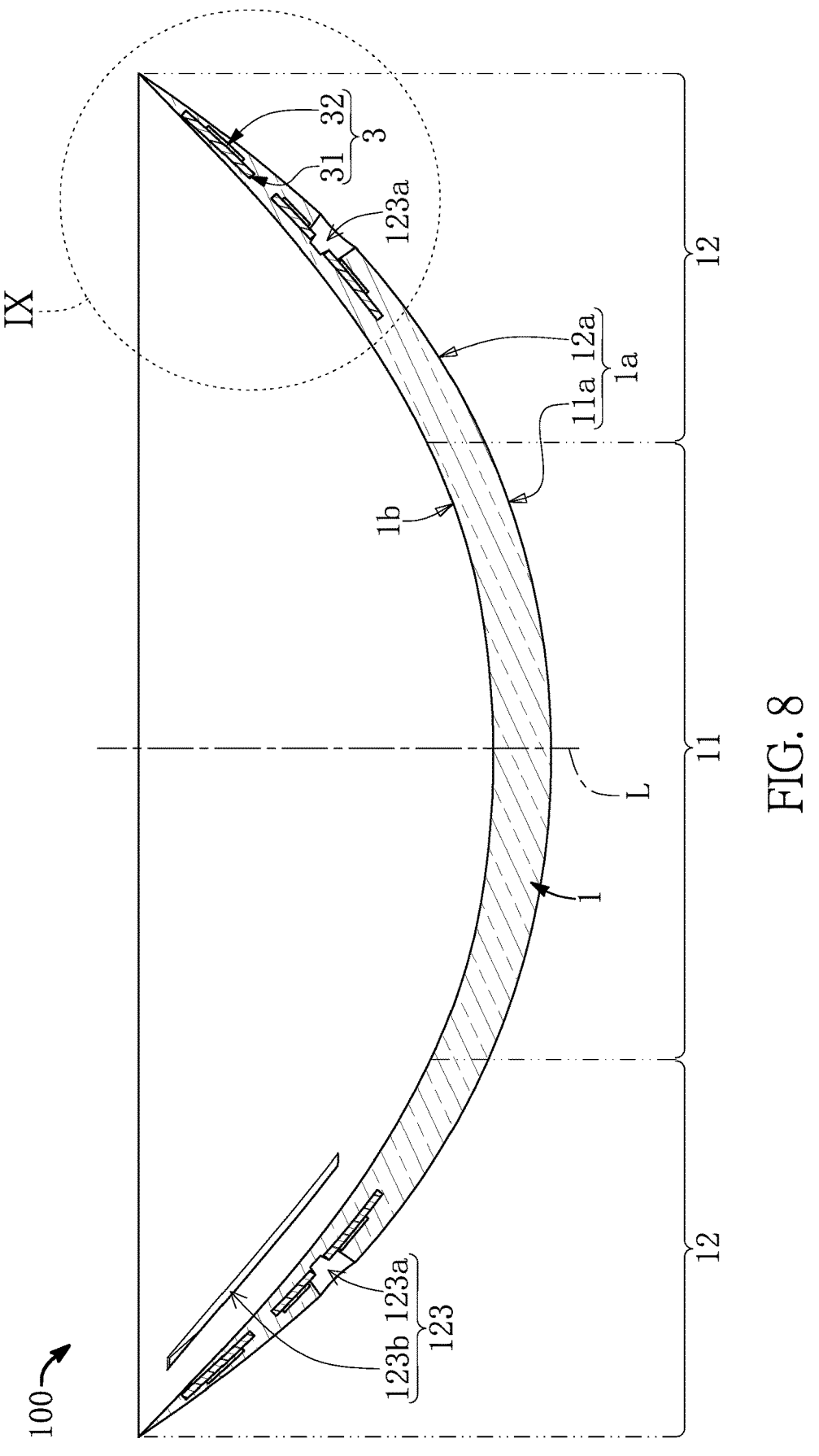
FIG. 8 is a schematic cross-sectional view taken along line VIII-VIII of FIG. 1.
Figure 9:
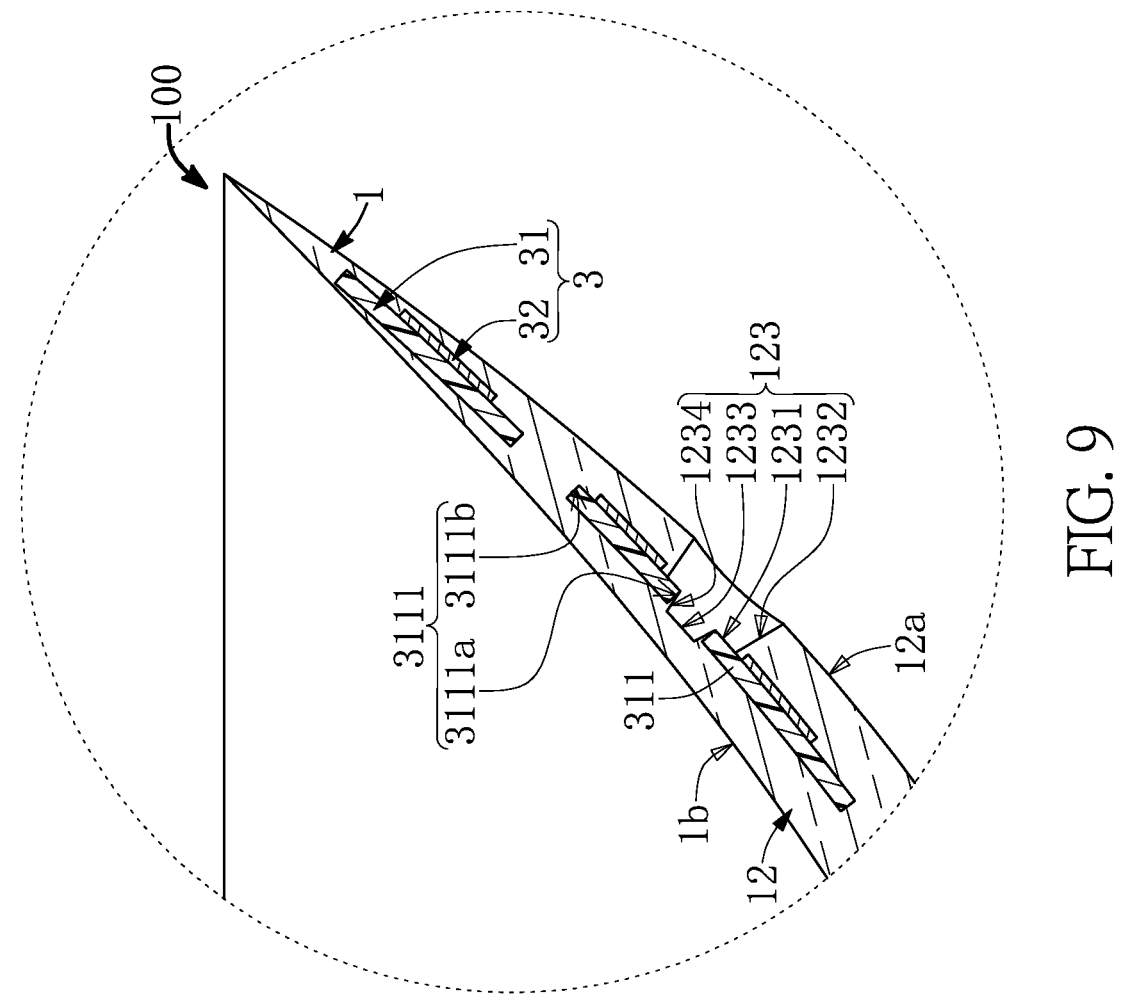
FIG. 9 is a schematic enlarged view of part IX of FIG. 8.

It should be noted the structure and shape of each of the front positioning slots 123a can be adjusted or changed according to design requirements, and the front positioning slots 123a in the present embodiment are formed in different structures (as shown in FIG. 4 and FIG. 8), thereby facilitating the high precision positioning of the circuit structure 3.

Specifically, a depth of any one of the front positioning slots 123a in the lower eyelid region 122 is greater than a depth of another one of the front positioning slots 123a in the layout region 121. Moreover, the bottom side (or the first tread 1231) of any one of the front positioning slots 123a in the lower eyelid region 122 includes a part of the electronic component 2 to enable the part of the electronic component 2 to be exposed in the outer environment, thereby facilitating the high precision positioning of the circuit structure 3.

It should be noted that the contact lens 100 in the present embodiment can be further cooperated with any kinds of devices. For example, in other embodiments of the present disclosure not shown in the drawings, the contact lens 100 can be wirelessly connected to any wearable device (e.g., a glasses-mounted reader or a neck-worn reader) worn on a user, and the wearable device (or the reader) can use a common wireless transmission technology (e.g., the RFID technology in a bandwidth at 13.56 MHz or 860-960 MHz) or other wireless technologies of induction power or signal transmission so as to supply power, sensing function, or signal feedback for the contact lens 100, thereby providing an intelligent monitoring (e.g., a full-time intraocular pressure value collection and warning), an intelligent treatment (e.g., a dry eye drug sustained release control), AR services (e.g., an image projection), or other intelligent applications.

Second Embodiment

Figure 10:
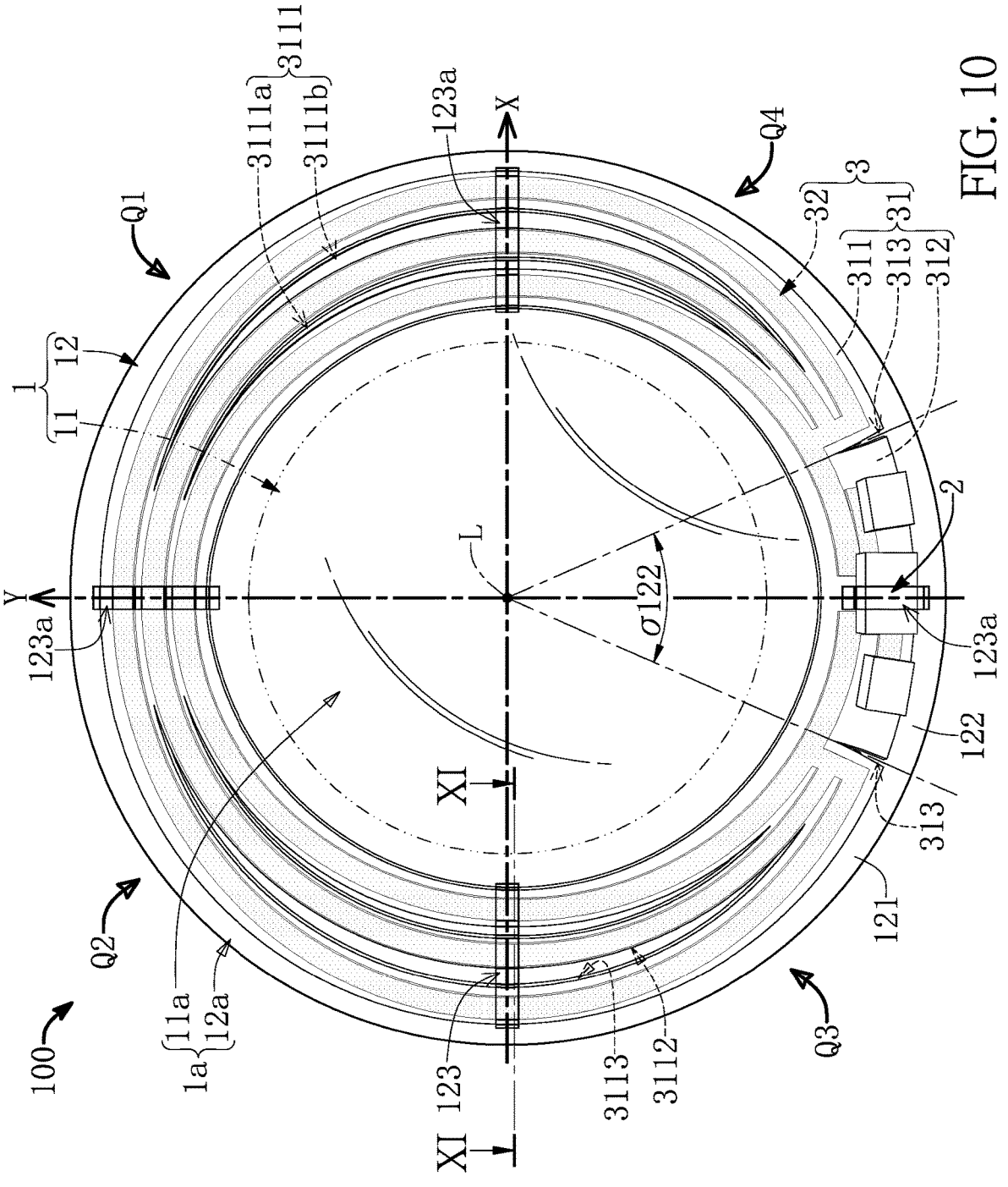
FIG. 10 is a schematic top view of the contact lens according to a second embodiment of the present disclosure.
Figure 11:
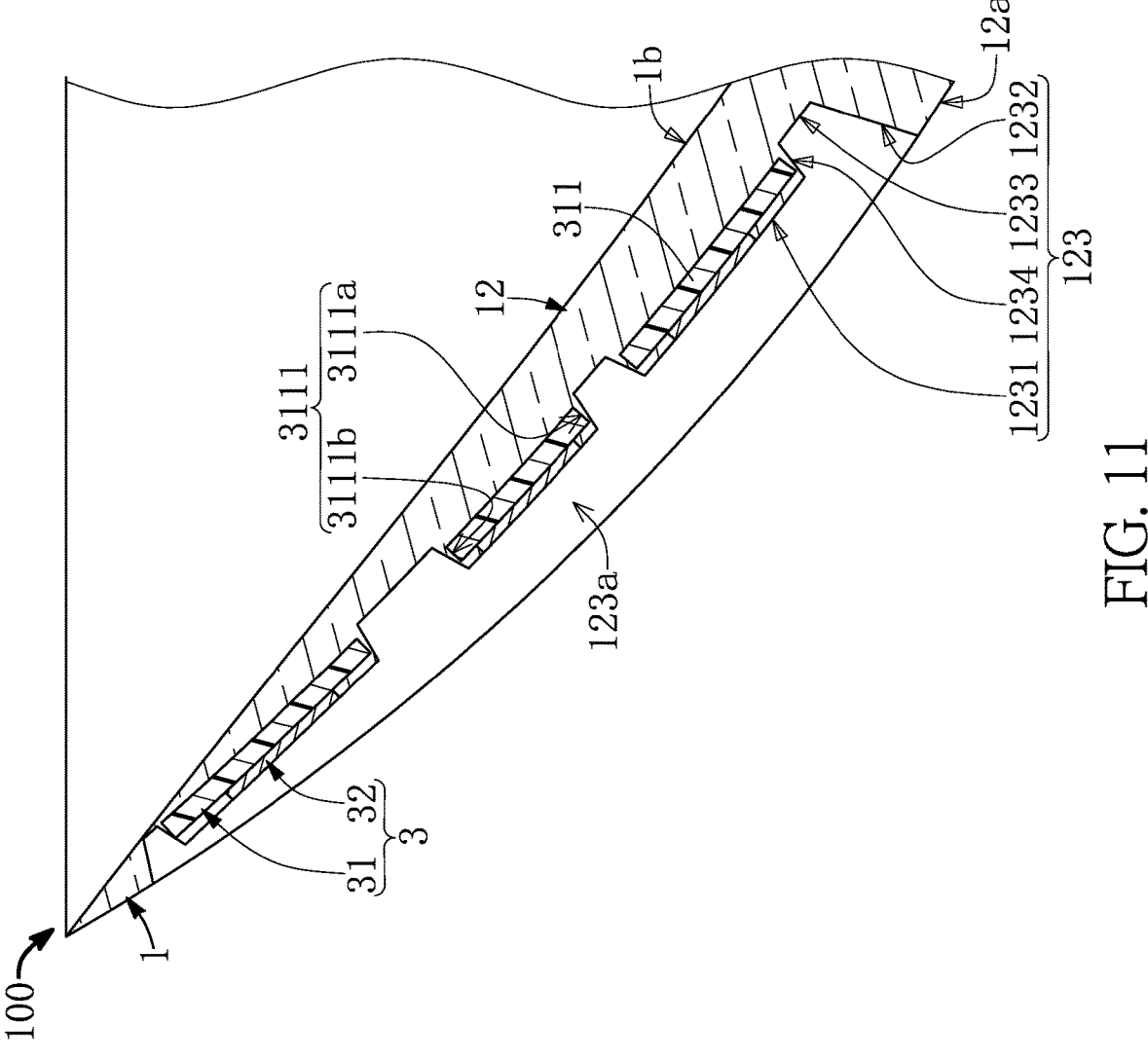
FIG. 11 is a schematic cross-sectional view taken along line XI-XI of FIG. 10.
Figure 12:
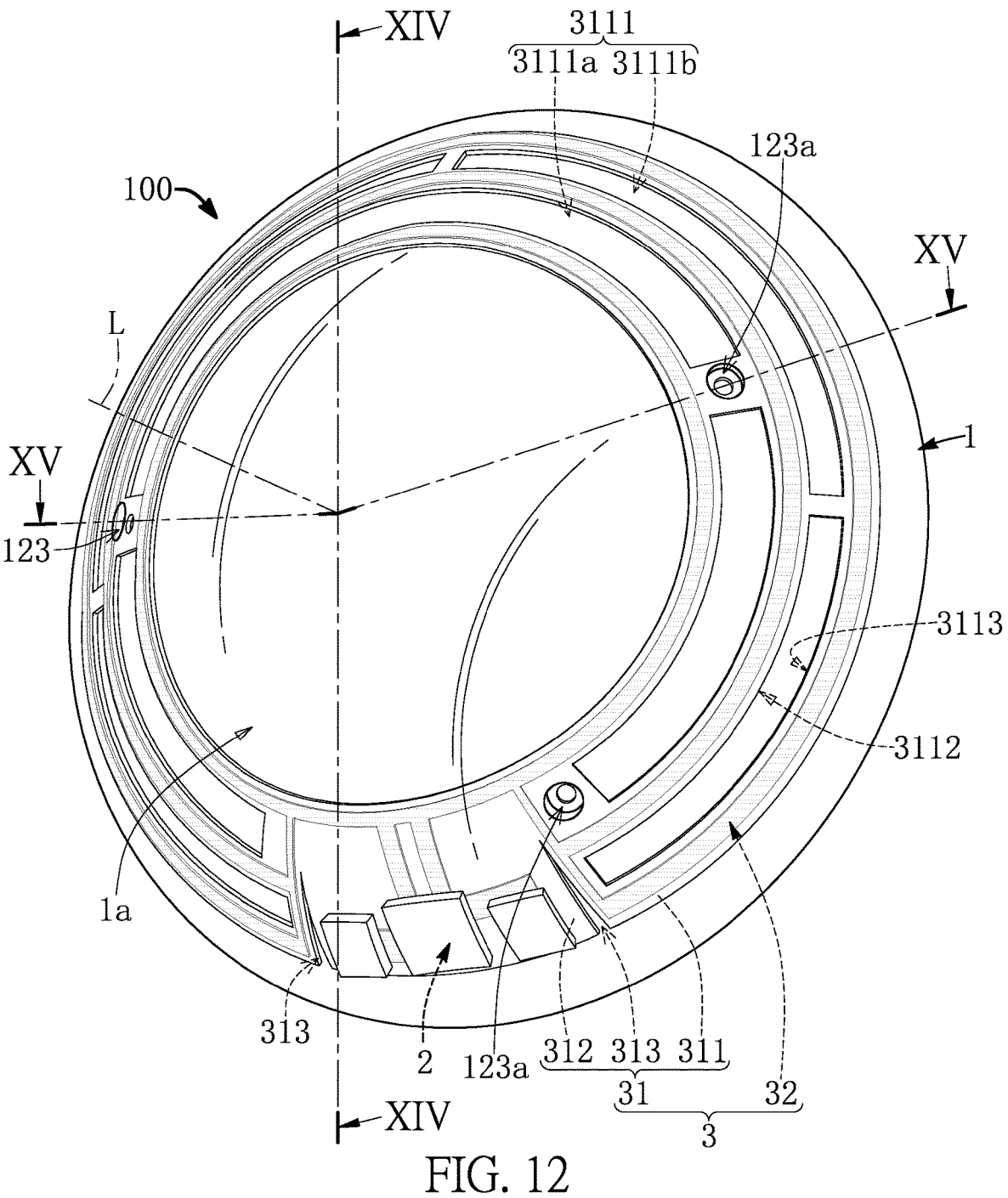
FIG. 12 is a schematic perspective view of the contact lens according to a third embodiment of the present disclosure.
Figure 13:
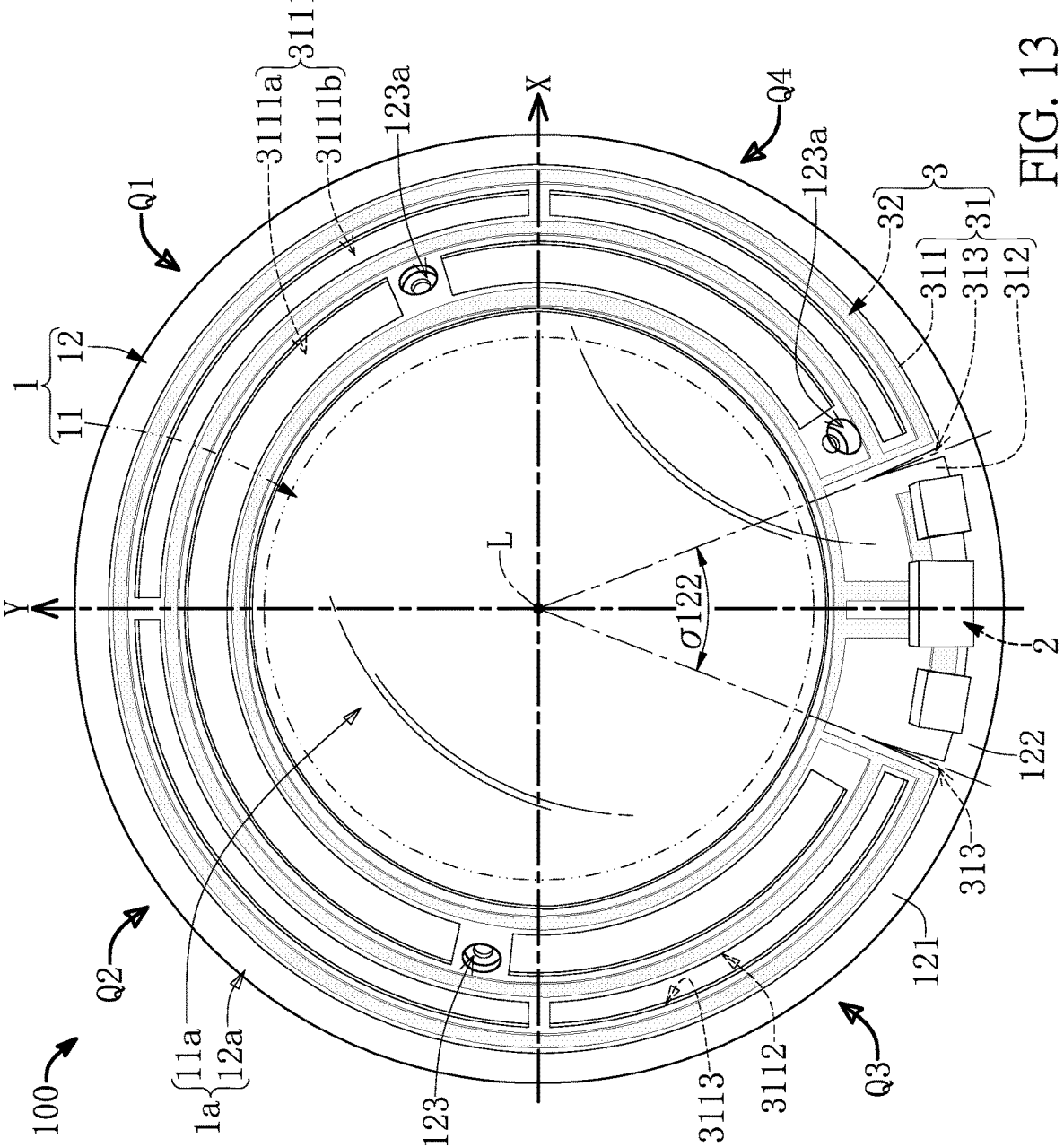
FIG. 13 is a schematic top view of FIG. 12.
Figure 14:
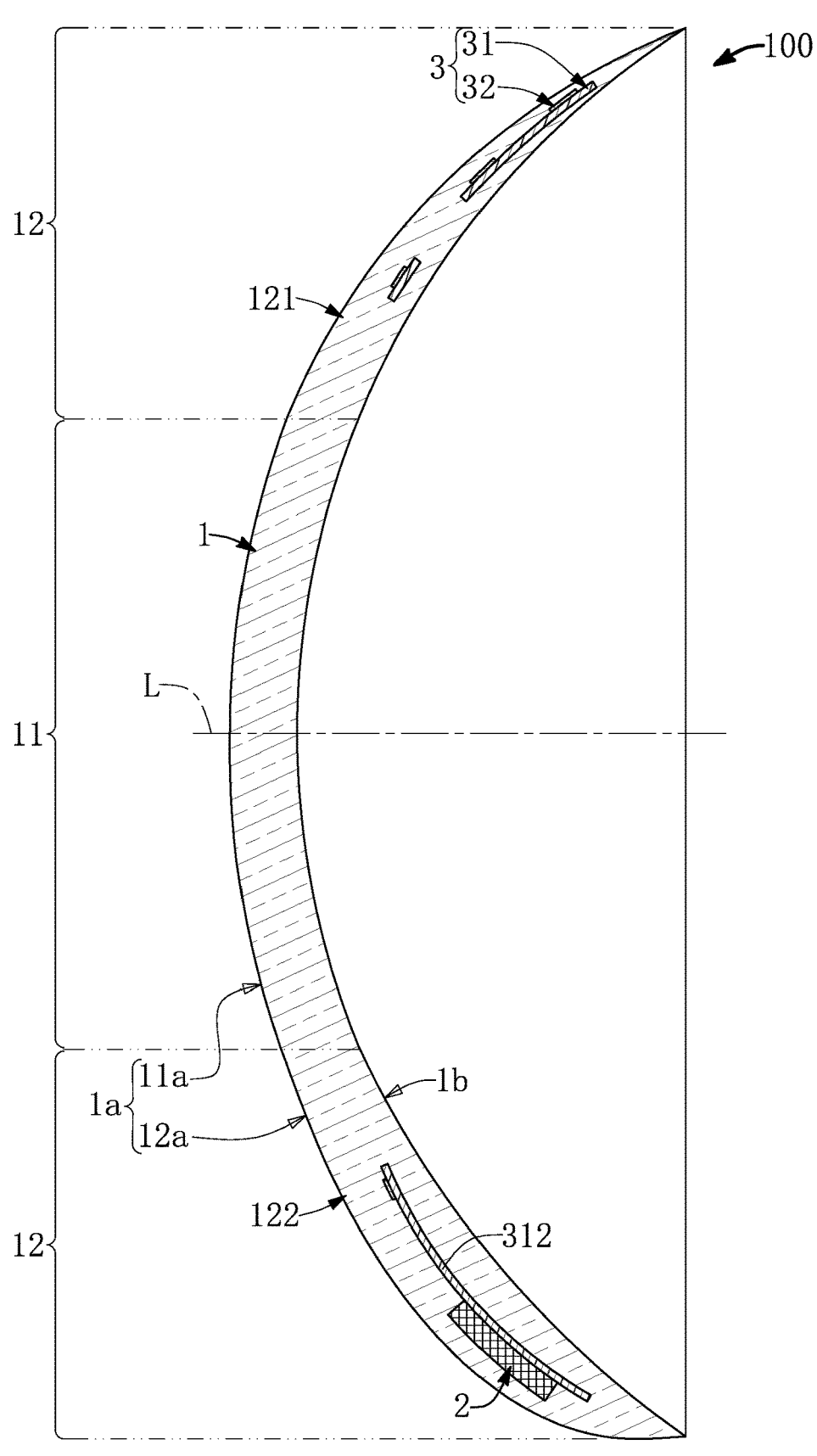
FIG. 14 is a schematic cross-sectional view taken along line XIV-XIV of FIG. 12.
Figure 15:
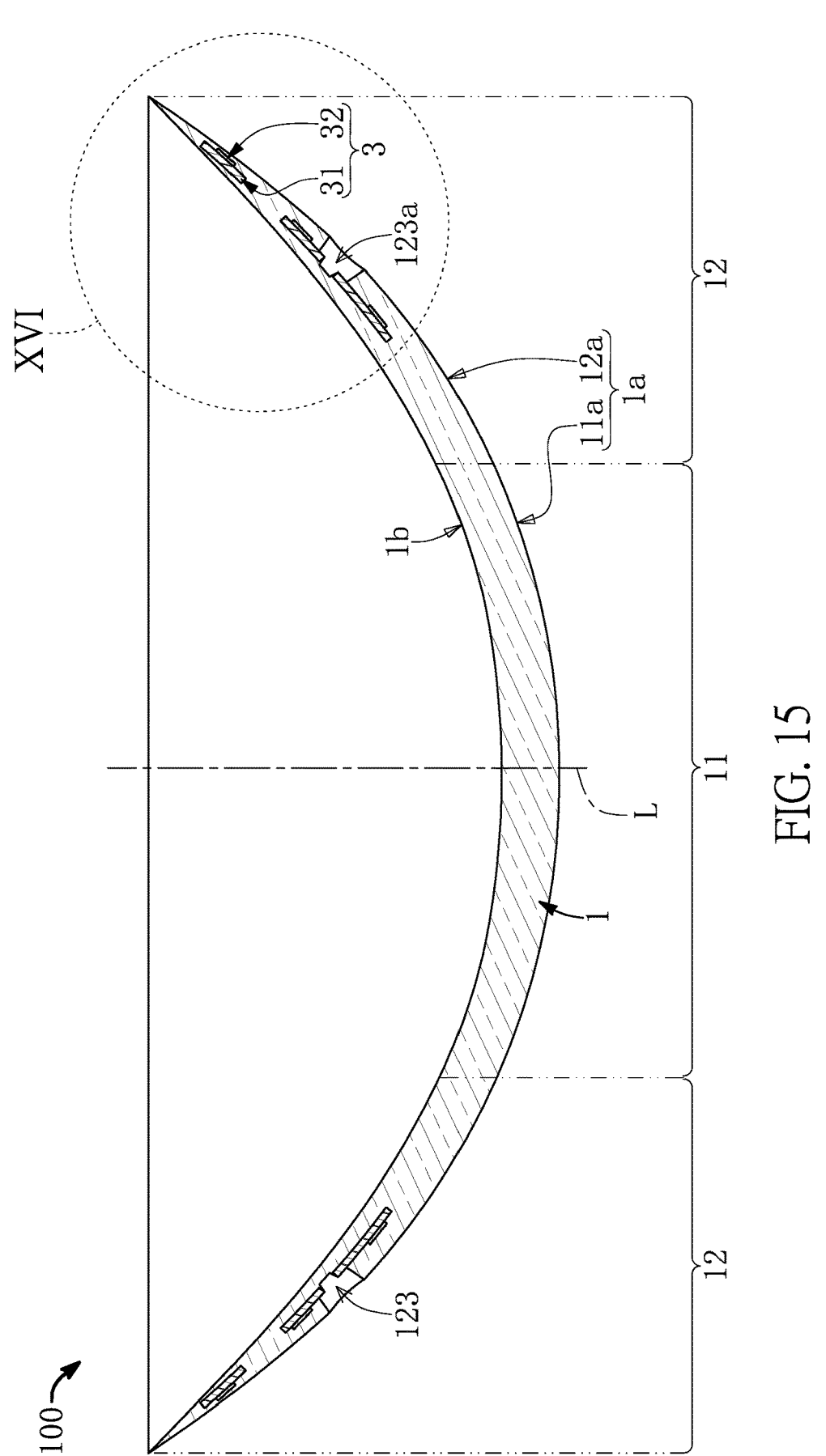
FIG. 15 is a schematic cross-sectional view taken along line XV-XV of FIG. 12.
Figure 16:
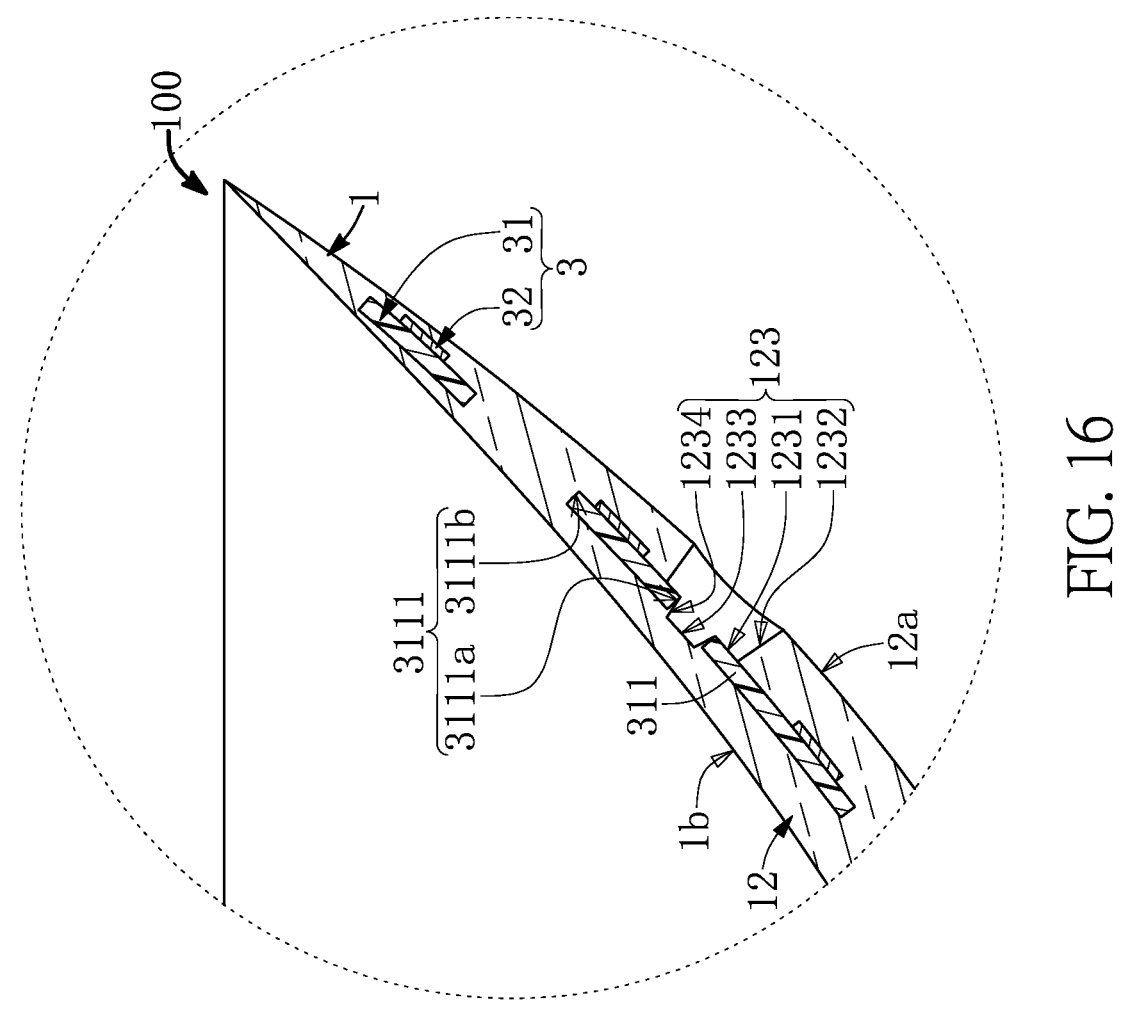
FIG. 16 is a schematic enlarged view of part XVI of FIG. 15.

Referring to FIG. 10 and FIG. 11, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, at least one of the front positioning slots 123a can be a jagged shape formed across the thru-holes 3111 so as to enable a part of each of the thru-holes 3111 to be exposed in the outer environment. In the top view of the contact lens 100, the front positioning slot 123a having the jagged shape extends along the radial direction of the lens body 1 and across the circuit structure 3. Moreover, a position of the part of each of the thru-holes 3111 corresponds to a position between the first tread surface 1231 and the second tread surface 1233 of the front positioning slot 123a having the jagged shape.

Specifically, in the front positioning slot 123a having the jagged shape, each of the first tread surface 1231 and the second tread surface 1233 includes a plurality of segments being separate from each other, the first tread surface 1231 includes the part of the circuit structure 3 for exposing the part of the circuit structure 3, a distance between the second tread surface 1233 and the front surface 1a is greater than a distance between the first tread surface 1231 and the front surface 1a, and the first riser surface 1232 is connected to the free curved surface 12a and the second tread surface 1233.

In summary, the annular wearing portion 12 of the contact lens 100 in the present embodiment is provided with the front positioning slot 123a having the jagged shape and being formed across the thru-holes 3111, thereby further facilitating the high precision positioning of the circuit structure 3.

Third Embodiment

Referring to FIG. 12 to FIG. 16, a third embodiment of the present disclosure, which is similar to the first and second embodiments of the present disclosure, is provided. For the sake of brevity, descriptions of the same components in the first to third embodiments of the present disclosure will be omitted herein, and the following description only discloses different features among the first to third embodiments.

In the present embodiment, each of the thru-holes 3111 has an elongated shape substantially having a same width, the front positioning slots 123a are formed in the layout region 121, and the carrier 31 has a plurality of radial notches 313 recessed from an outer edge thereof toward the central axis L. In addition, the structure of the front positioning slot 123a and the connection relationship between the front positioning slot 123a and the circuit structure 3 are similar to those disclosed in the first embodiment shown in FIG. 1 and FIG. 9, and are omitted herein for the sake of brevity.

Specifically, in the top view of the contact lens 100, an area of the thru-holes 3111 arranged in the first quadrant Q1 and the second quadrant Q2 can be greater than an area of the thru-holes 3111 arranged in the third quadrant Q3 and the fourth quadrant Q4. Moreover, an area of the thru-holes 3111 should be 1% to 85% (e.g., preferably 10% to 40%) of an area surrounded by an outer contour of the C-shaped segment 311.

Moreover, any two of the thru-holes 3111 adjacent to each other can be provided with one of the front positioning slots 123a therebetween, and the thru-holes 3111 include a plurality of first thru-holes 3111a and a plurality of second thru-holes 3111b. The first thru-holes 3111a are located at an inner side of the second thru-holes 3111b. In other words, a radius of each of the second thru-holes 3111b is different from (e.g., greater than) a radius of each of the first thru-holes 3111a.

In the present embodiment, each of the first thru-holes 3111a is in an arced shape having a center of circle located on the central axis L, and the first thru-holes 3111a are spaced apart from each other. Each of the second thru-holes 3111b is in an arced shape having a center of circle located on the central axis L, and the second thru-holes 3111b are spaced apart from each other.

Specifically, in the top view of the contact lens 100, a partition between any two of the first thru-holes 3111a adjacent to each other has one of the front positioning slots 123a, and the partition between any two of the first thru-holes 3111a adjacent to each other and a partition (not having the front positioning slot 123a) between any two of the second thru-holes 3111b adjacent to each other are not arranged in a same radial direction of the contact lens 100, thereby facilitating the high precision positioning of the circuit structure 3.

Beneficial Effects of the Embodiments

In conclusion, the contact lens of the present disclosure is provided with the free curved surface arranged on the front surface of the lens body, so that a thickness of the layout region does not need to be based completely on (or be equal to) a thickness of the lower eyelid region for thinning the layout region (e.g., the thickness of the annular wearing portion gradually increases in a direction toward the lower eyelid region). Accordingly, an oxygen permeability of the layout region can be effectively increased, and the foreign body sensation of the contact lens can be reduced (or improved).

Moreover, the contact lens of the present disclosure is provided with the at least one thru-hole being formed on the C-shaped segment and having a specific area (e.g., the area of the at least one thru-hole 3111 is 1% to 85% of the area surrounded by an outer contour of the C-shaped segment 311), thereby effectively reducing the generation of wrinkles or the stress concentration on the carrier, and further increasing the oxygen permeability of the contact lens by being cooperated with the free curved surface.

Furthermore, in the contact lens provided in the present disclosure, the annular wearing portion is designed to have the positioning slots for facilitating the high precision positioning of the circuit structure and the electronic component in the manufacturing process of the contact lens, so that the contact lens can have a high conformity in mass production.

Specifically, the positioning slots can be controlled in a specific scope (e.g., the sum of areas of openings of the positioning slots is less than or equal to 1% of the sum of area of the front surface and area of the rear surface), thereby preventing the strength of the contact lens from being affected. Moreover, part of the circuit structure is exposed from the corresponding positioning slot for increasing the heat-dissipation efficiency of the circuit structure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A contact lens, comprising:
a lens body including an optical portion and an annular wearing portion that surrounds the optical portion, wherein the annular wearing portion has a layout region being C-shaped and a lower eyelid region that is arranged between two ends of the layout region; and
a circuit structure embedded in the annular wearing portion and including:
a carrier having a C-shaped segment embedded in the layout region and a connection segment that is embedded in the lower eyelid region, wherein the connection segment is connected in-between two distal ends of the C-shaped segment; and
a circuit formed on the carrier;
wherein the C-shaped segment has at least one thru-hole that is fully filled with the lens body, and wherein, in a top view of the contact lens, an area of the at least one thru-hole is 1% to 85% of an area surrounded by an outer contour of the C-shaped segment;
wherein the at least one thru-hole is curved and has a width that gradually increases from two ends thereof toward a center thereof.

2. The contact lens according to claim 1, wherein, in the top view of the contact lens, the area of the at least one thru-hole is 1% to 75% of an area of the annular wearing portion.

3. The contact lens according to claim 1, wherein the circuit has at least one enclosed loop, and the at least one thru-hole is arranged in the at least one enclosed loop.

4. The contact lens according to claim 1, wherein the at least one thru-hole has an inner edge and an outer edge, and two ends of the inner edge are respectively connected to two ends of the outer edge so as to form the two ends of the at least one thru-hole.

5. The contact lens according to claim 4, wherein the optical portion defines a central axis, and a center of the inner edge and a center of the outer edge are respectively located on two different planes perpendicular to the central axis.

6. The contact lens according to claim 1, wherein the optical portion defines a central axis, and wherein, in the top view of the contact lens, the central axis defines an origin point, the contact lens is sequentially divided into a first quadrant, a second quadrant, a third quadrant, and a fourth quadrant along a counterclockwise direction with respect to the origin point, the lower eyelid region is arranged in the third quadrant and the fourth quadrant, and the at least one thru-hole is arranged in the first quadrant, the second quadrant, the third quadrant, and the fourth quadrant.

7. The contact lens according to claim 6, wherein, in the top view of the contact lens, a central angle of the lower eyelid region with respect to the origin point is within a range from 30 degrees to 180 degrees.

8. The contact lens according to claim 6, wherein, in the top view of the contact lens, four parts of the at least one thru-hole are respectively arranged in the first quadrant, the second quadrant, the third quadrant, and the fourth quadrant, and an area of any one of the four parts of the at least one thru-hole is 50% to 150% of an area of another one of the four parts of the at least one thru-hole.

9. The contact lens according to claim 6, wherein, in the top view of the contact lens, an area of a part of the at least one thru-hole arranged in the first quadrant and the second quadrant is greater than an area of another part of the at least one thru-hole arranged in the third quadrant and the fourth quadrant.

10. The contact lens according to claim 1, wherein a quantity of the at least one thru-hole is more than one, and the thru-holes include a plurality of first thru-holes spaced apart from each other, and wherein each of the first thru-holes is in an arced shape having a center of circle located on a central axis defined by the optical portion.

11. The contact lens according to claim 10, wherein the lens body includes:
a rear surface having a predetermined curvature for being worn on an eye; and
a front surface arranged opposite to the rear surface;
wherein the annular wearing portion has a plurality of front positioning slots recessed in the front surface, and any two of the thru-holes adjacent to each other have one of the front positioning slots arranged there-between.

12. The contact lens according to claim 11, wherein a bottom side of each of the front positioning slots includes a part of the circuit structure so as to enable the part of the circuit structure to be exposed in an external environment.

13. The contact lens according to claim 12, wherein each of the front positioning slots has:

a first tread surface including the part of the circuit structure exposed in the external environment;

a first riser surface connected in-between the front surface and the first tread surface;

a second tread surface spaced apart from the front surface by a distance that is greater than a distance between the first tread surface and the front surface; and a second riser surface connected in-between the first tread surface and the second tread surface and arranged at one side of the circuit structure or one side of the electronic component.

14. The contact lens according to claim 13, wherein the circuit is entirely embedded in the lens body.

15. The contact lens according to claim 11, wherein a depth of each of the front positioning slots is within a range from 50 μm to 100 μm.

16. The contact lens according to claim 11, wherein the front surface has a viewable surface corresponding in position to the optical portion and a free curved surface that corresponds in position to the annular wearing portion, and wherein the viewable surface has a first curvature being different from a second curvature of the free curved surface, and a thickness of the annular wearing portion gradually increases in a direction toward the lower eyelid region.

17. The contact lens according to claim 10, wherein the thru-holes include a plurality of second thru-holes spaced apart from each other, each of the second thru-holes is in an arced shape having a center of circle located on the central axis, and a radius of each of the second thru-holes is different from a radius of each of the first thru-holes.

18. The contact lens according to claim 17, wherein, in the top view of the contact lens, a partition between any two of the first thru-holes adjacent to each other and a partition between any two of the second thru-holes adjacent to each other are not arranged in a same radial direction of the contact lens.

19. The contact lens according to claim 1, wherein the optical portion defines a central axis, and the carrier has a plurality of radial notches recessed from an outer edge thereof toward the central axis, and wherein the contact lens includes an electronic component embedded in the lower eyelid region, and the circuit is connected to the electronic component to establish an electrical connection therebetween.

20. A contact lens, comprising:

a lens body including an optical portion and an annular wearing portion that surrounds the optical portion, wherein the annular wearing portion has a layout region being C-shaped and a lower eyelid region that is arranged between two ends of the layout region; and a circuit structure embedded in the annular wearing portion and including:

a carrier having a C-shaped segment embedded in the layout region and a connection segment that is embedded in the lower eyelid region, wherein the connection segment is connected in-between two distal ends of the C-shaped segment; and a circuit formed on the carrier;

wherein the C-shaped segment has at least one thru-hole that is fully filled with the lens body, and wherein, in a top view of the contact lens, an area of the at least one thru-hole is 1% to 85% of an area surrounded by an outer contour of the C-shaped segment;

wherein a quantity of the at least one thru-hole is more than one, and the thru-holes include a plurality of first thru-holes spaced apart from each other, and wherein each of the first thru-holes is in an arced shape having a center of circle located on a central axis defined by the optical portion, and wherein the lens body includes:

a rear surface having a predetermined curvature for being worn on an eye; and a front surface arranged opposite to the rear surface;

wherein the annular wearing portion has a plurality of front positioning slots recessed in the front surface, and any two of the thru-holes adjacent to each other have one of the front positioning slots arranged there-between.

21. A contact lens, comprising:

a lens body including an optical portion and an annular wearing portion that surrounds the optical portion, wherein the annular wearing portion has a layout region being C-shaped and a lower eyelid region that is arranged between two ends of the layout region; and a circuit structure embedded in the annular wearing portion and including:

a carrier having a C-shaped segment embedded in the layout region and a connection segment that is embedded in the lower eyelid region, wherein the connection segment is connected in-between two distal ends of the C-shaped segment; and a circuit formed on the carrier;

wherein the C-shaped segment has at least one thru-hole that is fully filled with the lens body, and wherein, in a top view of the contact lens, an area of the at least one thru-hole is 1% to 85% of an area surrounded by an outer contour of the C-shaped segment;

wherein a quantity of the at least one thru-hole is more than one, and the thru-holes include a plurality of first thru-holes spaced apart from each other, and wherein each of the first thru-holes is in an arced shape having a center of circle located on a central axis defined by the optical portion;

wherein the thru-holes include a plurality of second thru-holes spaced apart from each other, each of the second thru-holes is in an arced shape having a center of circle located on the central axis, and a radius of each of the second thru-holes is different from a radius of each of the first thru-holes.

22. A contact lens, comprising:

a lens body including an optical portion and an annular wearing portion that surrounds the optical portion, wherein the annular wearing portion has a layout region being C-shaped and a lower eyelid region that is arranged between two ends of the layout region; and a circuit structure embedded in the annular wearing portion and including:

a carrier having a C-shaped segment embedded in the layout region and a connection segment that is embedded in the lower eyelid region, wherein the connection segment is connected in-between two distal ends of the C-shaped segment; and a circuit formed on the carrier;

wherein the C-shaped segment has at least one thru-hole that is fully filled with the lens body, and wherein, in a top view of the contact lens, an area of the at least one thru-hole is 1% to 85% of an area surrounded by an outer contour of the C-shaped segment;

wherein the optical portion defines a central axis, and the carrier has a plurality of radial notches recessed from an outer edge thereof toward the central axis, and wherein the contact lens includes an electronic component embedded in the lower eyelid region, and the circuit is connected to the electronic component to establish an electrical connection therebetween.

* * * * *